(12) United States Patent  
Cheng et al.

(10) Patent No.: US 9,785,192 B1  
(45) Date of Patent: Oct. 10, 2017

(54) DEPOSIT DISSIPATING LAYER

(71) Applicant: AMAZON TECHNOLOGIES, INC., Reno, NV (US)

(72) Inventors: Shan Cheng, Los Altos, CA (US); Sasirekha Kodialam, Livermore, CA (US); Julie Marie Connors, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 500 days.

(21) Appl. No.: 14/069,804

(22) Filed: Nov. 1, 2013

(51) Int. Cl.
| | |
|---|---|
| *G06F 1/16* | (2006.01) |
| *B32B 9/04* | (2006.01) |
| *B32B 27/06* | (2006.01) |
| *C03C 17/23* | (2006.01) |

(52) U.S. Cl.
CPC ............ *G06F 1/1643* (2013.01); *B32B 9/04* (2013.01); *B32B 27/06* (2013.01); *B32B 2457/202* (2013.01); *C03C 17/23* (2013.01)

(58) Field of Classification Search
None
See application file for complete search history.

(56) References Cited

U.S. PATENT DOCUMENTS

| | | | |
|---|---|---|---|
| 2007/0218264 A1* | 9/2007 | Gueneau et al. | ............. 428/220 |
| 2009/0080080 A1* | 3/2009 | Takahashi et al. | ........... 359/601 |
| 2010/0033403 A1* | 2/2010 | Liao | ............................. 345/2.1 |
| 2010/0197487 A1* | 8/2010 | Eder et al. | .................... 502/242 |

OTHER PUBLICATIONS

Information Display SID 2010, "Eliminating Fingerprints on Displays", May 30, 2010 <<Retrieved from http://www.sidchapters.org/texas/TX_Chapter_Data/2009_11_17%20SID/091117_SID_UniPixel_FPR.pdf, 4 pgs.

"Theory, Design, and Production of Finger Print Resistant Films", Nov. 2009, <<Retrieved from http://www.walkermobile.com/Eliminating_Fingerprints_on_Displays_SID2010Blog.pdf>>, 46 pgs.

* cited by examiner

*Primary Examiner* — Anthony J Frost
(74) *Attorney, Agent, or Firm* — Lindauer Law, PLLC

(57) ABSTRACT

Described in this disclosure is a surface configured to break down deposits thereon. The surface may include breakdown structures, oleophilic structures, and hydrophilic structures. The oleophilic structures and hydrophilic structures are configured to disperse a deposit, such as fingerprint residue, to the breakdown structures. This dispersion increases the surface area of the deposit with respect to the breakdown structures, increasing the contact area between the two. The breakdown structures modify the deposit physically, chemically, or both, such that fragments are distributed into the ambient environment. The surface may be applied to portable electronic devices.

20 Claims, 12 Drawing Sheets

DEPOSIT DISSIPATING LAYER

BACKGROUND

Fingerprints, dirt, and other materials deposited on surfaces may adversely impact the aesthetics, functionality, or both of those surfaces. For example, a fingerprint or other type of smudge on a touchscreen of a portable electronic device may be unsightly and interfere with a user's ability to view an image presented on the touchscreen.

Figure 1:
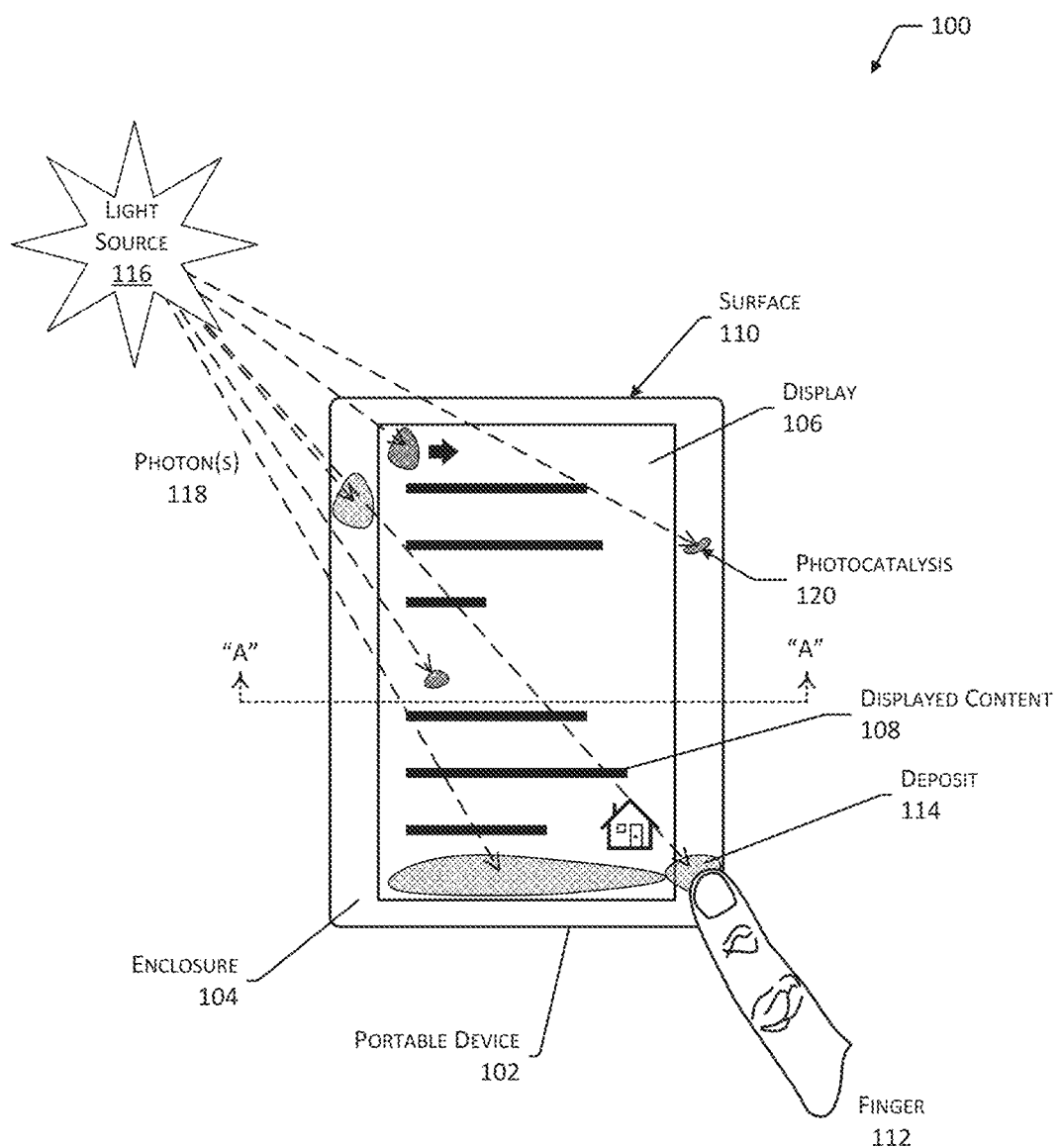
FIG. 1 is an illustrative portable electronic device having a surface configured to disassociate deposits, such as fingerprints, placed thereon.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout. The figures are not drawn to scale. Unless otherwise specified relative sizes or proportions between elements of the figures are illustrative and are not to be construed as limiting.

DETAILED DESCRIPTION

Users may physically touch surfaces on a wide variety of objects including portable electronic devices, in-vehicle entertainment or control systems, desktop computers, and so forth. These touches may leave behind deposits, such as fingerprints, smudges, and other materials. These deposits may adversely impact the aesthetics, functionality, cleanliness, and/or any other attribute of the objects. For example, fingerprints and smudges on a touchscreen may adversely impact the ability of the user to clearly see images presented on the screen.

Described in this application are examples of surfaces comprising structures which disperse and break down the deposits into fragments, providing a self-cleaning effect. These structures may be comprised of materials which are oleophilic, hydrophilic, or both. This surface may have one or more layers which may be applied to, or integrated with, the objects such as portable electronic devices. The surfaces described in this disclosure have a thickness greater than zero. Within this thickness, the surface may include one or more layers, one or more different materials or structures, or a combination thereof. For example, the surface may comprise a film, a layer having interspersed structures, and so forth.

The breakdown of the deposit may involve chemical processes, physical processes, or a combination thereof. Once broken down, the resulting fragments may fall away from the surface, volatilize into the ambient atmosphere, or otherwise be distributed into the environment. In some implementations at least a portion of the resulting fragments may remain within the surface.

One or more dispersion layers may be operable to or may be configured to disperse the deposit across a portion of a breakdown layer. The dispersion increases surface area of the deposit in contact with the breakdown layer. This increased surface area allows the breakdown layer to interact with more of the deposit. This may improve breakdown of the deposit, reduce time to break down the deposit, and so forth.

The dispersion layers may include one or more materials. These materials may be hydrophilic materials, oleophilic materials, or a combination thereof. In one implementation, the dispersion layers may comprise a layer of hydrophilic material arranged atop a layer of oleophilic material, which in turn is atop the breakdown layer. The dispersion layers may include one or more dispersion structures. For example, the dispersion structure may comprise a mesh incorporating hydro- and oleo-philic materials. The dispersion layers are configured to distribute the deposit across the breakdown layer. In some implementations, functionality of the dispersion layers may be incorporated into the breakdown layer.

The breakdown layer may operate through one or more mechanisms. In one implementation, photocatalysis may use energy from photons provided by a light source to generate chemical species such as free radicals which chemically react with the deposit. These chemical species may be generated from reactants in the ambient atmosphere, the deposit itself, the breakdown layer, or a combination thereof.

The breakdown layer renders the deposit into fragments which may be dispersed into the ambient environment. For example, chemical reactions may change a portion of the deposit into material which is more volatile and will outgas more readily to the ambient environment. Other chemical reactions may break the deposit into fragments which may then dissipate to the ambient environment.

By dispersing and breaking down the deposit, the surface may improve the aesthetics, hygiene, or other aspects of the object. For example, microbes may be broken down by the surface, reducing the possible transfer of disease. Furthermore, usability of the object may be improved during operation by reducing or eliminating impact of the deposit. For example, by breaking down fingerprints and smudges until they dissipate, the user may be better able to see information presented on a touchscreen.

Illustrative Devices

FIG. 1 is an illustrative system 100. A portable electronic device 102 is depicted. The portable electronic device 102 ("device") may be a tablet computer, smartphone, portable content player, eBook reader, medical device, piece of instrumentation, and so forth. The device 102 is portable in that a user may hold the device 102 or readily relocate the device 102 from one location to another.

The device 102 has an enclosure 104, such as an integral case, cover, and so forth. The device 102 may also have a display 106, configured to provide visual information such as displayed content 108 to the user. The display 106 may have a front or a top, through which the user is able to see the displayed content 108. In some implementations, the display 106 may be combined with some mechanism to detect a touch thereto, such as a touch sensor, camera, and so forth, to form a touchscreen.

A surface 110 may be applied to, or formed as part of, one or more of the enclosure 104, the display 106, and so forth. As described above, the surface 110 has a thickness which is greater than zero. For example, the surface 110 may be greater than one picometer thick. The surface 110 is configured to accept contact with an external object, such as a finger 112 or other part of a user's hand. The external object may transport or exude materials, which may be transferred to the surface 110, forming a deposit 114. The transfer may result from contact, proximity, and so forth. For example, the deposit 114 may comprise material from the tip of the finger 112, such as exudate produced by the eccrine glands of the finger 112. The deposit 114 may manifest as a fingerprint, smudge, droplet, splash, spill, and so forth. The deposit 114 may comprise one or more of organic or in-organic components.

The surface 110 is operable to process the deposit 114 such that it is broken down into fragments, chemically reacted with, and so forth. The surface 110 may include a breakdown layer. In some implementations, the breakdown layer may comprise titanium dioxide operable to provide photocatalysis 120 when illuminated by ultraviolet light. As illustrated here, a light source 116 such as the sun, room lights, or an illuminator built into the device 102, provide photons 118 to the breakdown layer of the surface 110. These photons 118 may provide the energy for the photocatalysis 120 to occur in the breakdown layer of the surface 110. As photocatalysis 120 proceeds, the deposit(s) 114 may be broken down into fragments or otherwise reacted such that they no longer are apparent to the user. The surface 110 is disclosed in more detail in the figures below.

The surface 110 may be configured to be opaque, or at least partially transparent or translucent to one or more wavelengths of visible light. For example, the surface 110 as used atop the display 106 is configured such that the displayed content 108 is visible to the user during operation. In one implementation, the surface 110 may be transmissive to at least 60% of one or more visible wavelengths incident upon the surface 110. The surface 110 may not be uniformly transmissive to all wavelengths of visible light. For example, the surface 110 may exhibit higher transmissivity at red wavelengths compared to blue.

In another implementation the surface 110 may be opaque or at least partially transmissive to non-visible light. For example, when used atop an optical fingerprint reader device, the surface 110 may be transparent to one or more wavelengths of non-visible light, such as near-infrared or ultraviolet used by the fingerprint reader device.

In other implementations, the surface 110 may be configured to be opaque to one or more wavelengths of visible light, non-visible light, and so forth. For example, the surface 110 may be arranged atop the enclosure 104 of the device 102, such as on one or more of the bezel, sides, or back. As the user handles the portable electronic device 102 and imparts deposits 114 on the surface 110, the deposits 114 are broken down. As described above, this improves the aesthetics and may also improve safety by preventing the surface 110 from remaining slippery due to an accumulation of the deposits 114.

The surface 110 may also be operable to be reflective at one or more wavelengths. For example, the surface 110 may be operable to be reflective to infrared wavelengths.

In addition to the device 102, the surface 110 may be used on other objects. For example, the surface 110 may be applied to tabletops, door handles, and so forth.

Figure 2:
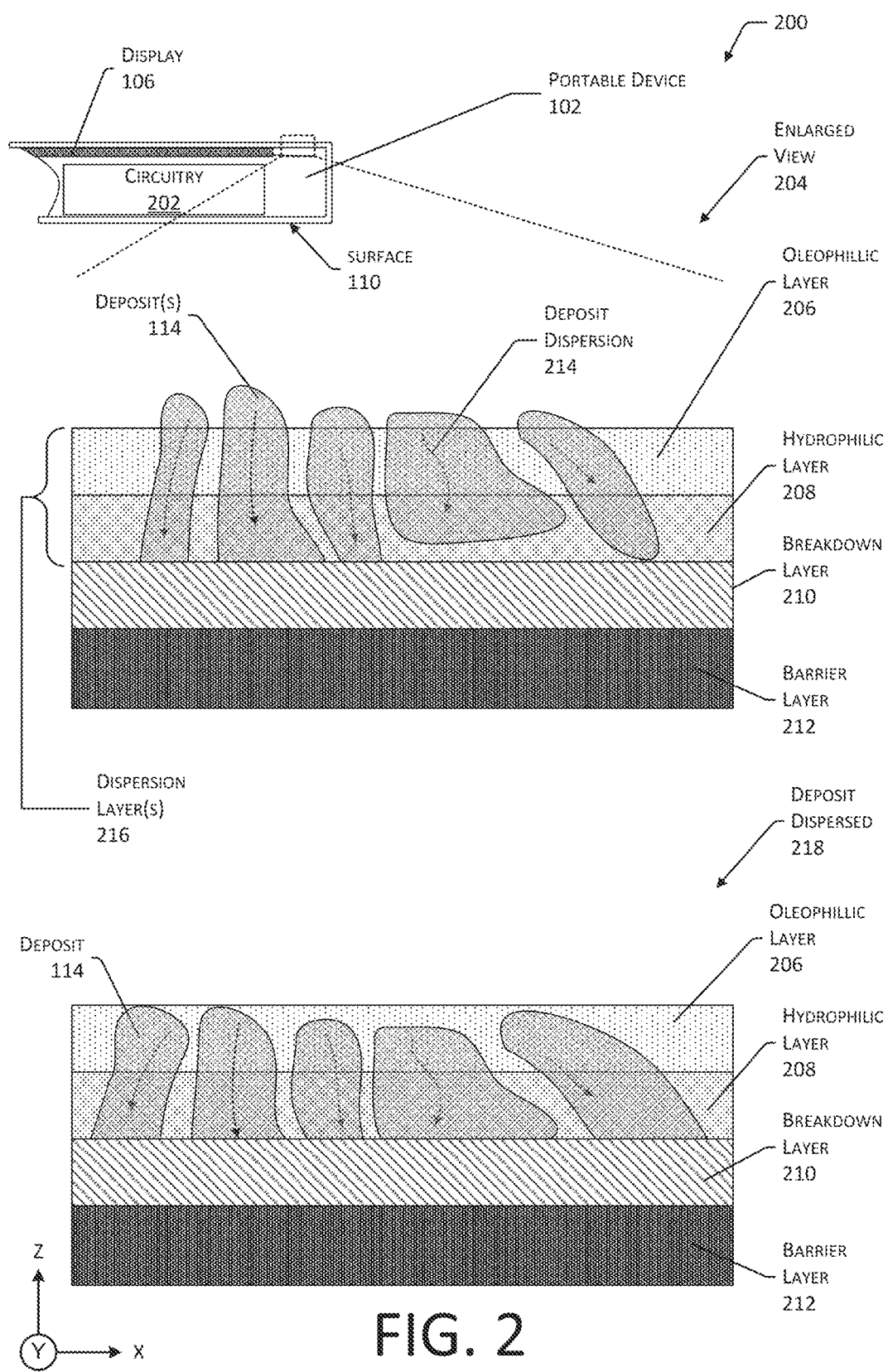
FIG. 2 illustrates a cross section of the surface, showing oleophilic and hydrophilic layers configured to disperse, across a breakdown layer, material deposited on a surface of a device.

FIG. 2 illustrates a cross section 200 of the surface 110 along the line "A-A" as depicted in FIG. 1. The cross section 200 depicts the display 106 and other internal circuitry 202 of the portable electronic device 102, such as a processor, memory, battery, and so forth. The surface 110 is depicted as covering the exterior of the device 102. In other implementations the surface 110 may cover the display 106 or portions of the exterior except for the display 106. For example, the surface 110 may be configured to cover the back and sides of the device 102, leaving the display 106 uncovered. The surface 110 may be applied by way of coating, physical vapor deposition, chemical vapor deposition, as a film, as a fabric, and so forth.

Depicted here is an enlarged view 204 of a portion of the surface 110. In the enlarged view 204 an oleophilic layer 206 is depicted. The oleophilic layer 206 is includes oleophilic materials which exhibit an affinity for oil-based materials. This affinity may use one or more of molecular or chemical characteristics of the oleophilic materials, physical characteristics, such as size and shape, or any combination to provide the affinity. The oleophilic materials may include, for example, hydrocarbons, thermoplastics, polycarbonate, polyvinylchloride, polymer materials, such as PET (polyethylene terephthalate), PP (polypropylene), PTFE (polytetrafluoroethylene) and PVDF (polyvinylidene fluoride), any other type of materials having an affinity for oils or combination thereof. Additionally or alternatively, the material may be treated (e.g., coated) to become oleophilic, be naturally oleophilic, or combination thereof. The oleophilic layer 206 may be arranged proximate to a hydrophilic layer 208. Proximity may include adjacency, abutment, contact, and so forth between two objects. For example, the oleophilic layer 206 may be adjacent to the hydrophilic layer 208. In some implementations, the oleophilic layer 206 or other oleophilic structures described herein may include a plurality of different oleophilic materials.

The hydrophilic layer 208 includes hydrophilic materials which exhibit an affinity for aqueous or water-based materials. The hydrophilic materials may include polymers comprising hydroxyls, acids, oxides, or organic salts. In some implementations, the hydrophilic layer 208 or other hydrophilic structures described herein may include a plurality of different hydrophilic materials Affinity of one material for another material may be measured as a surface contact angle. The surface contact angle may be obtained by placing a droplet of a probe liquid, such as an oil- or water-containing compound, on a material under test. A contact angle may be described as an angle between the surface of the material under test, through the droplet, and a tangent of the droplet's ovate shape at an edge of the droplet. In one implementation, measurement of the contact angle may comprise applying a drop of the probe liquid to the surface of the material and measuring an angle between the surface and the tangent of the droplet using a contact angle goniometer with a microscope or camera for visualization of the drop. The contact angle may also be described using the static sessile drop method, dynamic sessile drop method, dynamic Wilhelmy method, and so forth.

A high contact angle may be indicative of a low solid surface energy or chemical affinity for the material in the droplet. For example, a probe liquid of pure water placed on a material such as polytetrafluoroethylene ("PTFE") may exhibit a water contact angle of about 110 degrees. PTFE may be considered "hydrophobic". Conversely, a low contact angle may be indicative of a high solid surface energy or chemical affinity. For example, a probe liquid of pure water placed on a material such as poly(methyl methacrylate) ("PMMA") may exhibit a water contact angle of about 68 degrees. PMMA may be considered "hydrophilic". In one implementation, the contact angle may be determined using a system such as the VCA Optima™ by AST Products Inc., of Billerica, Mass.

Other probe liquids may be used to characterize the material. For example, squalene and/or other oil-based compounds may be used to determine oil contact angles. The oil contact angle is indicative of the affinity of the material to oil-based compounds. As used in this disclosure, a material is deemed to be "-philic" for a probe liquid when the contact angle is less than about 100 degrees, and "-phobic" when the contact angle is greater than 100 degrees.

In accordance with some example embodiments discussed herein, the oleophilic layer 206 or oleophilic material described in this disclosure may be characterized by an oil contact angle for a squalene-based material of less than 40 degrees. The hydrophilic layer 208 or hydrophilic material in this disclosure may have a water contact angle of less than 100 degrees.

The oleophilic layer 206 is proximate to the hydrophilic layer 208. The hydrophilic layer 208, in turn, may be proximate to the breakdown layer 210. As described above, proximity may include adjacency, abutment, contact, and so forth between two objects. The breakdown layer 210, in turn, is proximate to a barrier layer 212. In another implementation the oleophilic layer 206 may be proximate to the breakdown layer 210, while the hydrophilic layer 208 is atop the oleophilic layer 206.

The barrier layer 212 is impermeable to water- and oil-based materials. For example, the barrier layer 212 may comprise a glass, plastic, metal, ceramic, composite, and so forth. In some implementations the barrier layer 212 may be used as a substrate upon which the breakdown layer 210 may be deposited or coupled to during manufacturing. In some implementations, the barrier layer 212 may be omitted, while in others the barrier layer 212 may comprise another structure, such as a portion of a display device, exterior plastic of a housing or case, and so forth.

The breakdown layer 210 is configured to render the deposit 114 such that pieces thereof may be dispersed into the ambient environment. The breakdown layer 210 may use one or more mechanisms to produce these pieces. For example, the breakdown layer 210 may comprise nanostructures formed from titanium dioxide. These nanostructures are configured to support photocatalysis 120, using as reactants the ambient environment, the deposit 114, or both. The photocatalysis 120 may use the photons 118 to energize the reaction. The breakdown layer 210 is discussed in more detail below with regard to FIG. 3.

The deposit 114 may come in contact with the upper or outer layer of the surface 110. The oleophilic layer 206 and the hydrophilic layer 208 are configured to disperse or distribute at least a portion of the deposit 114 such that surface area of the deposit 114 is increased relative to a first surface area at a time of contact with the surface 110. In this illustration, deposit dispersion 214 is indicated as the deposit 114 spreads out. This increase in surface area increases the area of the breakdown layer 210 which is in contact with the deposit 114, thus providing additional opportunity for the deposit 114 to be broken down by the action of the breakdown layer 210.

For ease of illustration, and not necessarily as a limitation, the portion of the surface 110 which is configured to distribute the deposit 114 may be designated a dispersion layer(s) 216. In this illustration, the dispersion layer 216 comprises the oleophilic layer 206 and the hydrophilic layer 208. The dispersion layer 216 is proximate to the breakdown layer 210, which in turn is proximate to the barrier layer 212. In some implementations, the dispersion layer 216, the breakdown layer 210, and the barrier layer 212 may be laminated or otherwise bonded to one another to form the surface 110. In other implementations, such as described below with regard to FIG. 4, functions of the dispersion layer(s) 216 may be integrated into the breakdown layer 210.

The dispersion layer 216 illustrated here and below is depicted with a single oleophilic layer 206 and a single hydrophilic layer 208 for ease of illustration, and not necessarily as a limitation. In some implementations the dispersion layers 216 may include a plurality of oleophilic layers 206, hydrophilic layers 208, or both. For example, the dispersion layers 216 may comprise a first oleophilic layer 206(1) proximate to a first hydrophilic layer 208(1) which in turn is proximate to a second oleophilic layer 206(2) proximate to a second hydrophilic layer 208(2), and so forth.

A second view depicts the deposit 114 as dispersed 218 by the dispersion layer(s) 216. In this view, the deposit 114 has been drawn into and is now below the surface of the dispersion layer(s) 216. In some implementations, the surface 110 may now appear to be noticeably cleaner. Meanwhile, the breakdown layer 210 may be breaking down the deposit 114.

The dispersion layer(s) 216 may be configured to provide an index of refraction which is similar to that of the deposit 114. For example, the index of refraction for the dispersion layer 216 may be 1.4, approximately the same as that of human fingerprints. Matching the indices of refraction may reduce visibility of the deposit 114.

The surface 110 may also be configured to provide other characteristics, such as antiglare, antireflection, and so forth. These characteristics may be provided by configuring one or more of the dispersion layer(s) 216, the breakdown layer 210, the barrier layer 212. For example, thickness of the oleophilic layer 206 may be adjusted to provide an antireflective effect to one or more wavelengths of incident light.

Fabrication of the surface 110 may include one or more of lamination, chemical vapor deposition, physical vapor deposition, sputtering, painting, or other type of coating process. For example, the breakdown layer 210 may be applied as a coating onto the barrier layer 212, followed by the hydrophilic layer 208 and the oleophilic layer 206. In another implementation, fabrication may include introduction of structures, such as described below with regard to FIG. 4.

Figure 3:
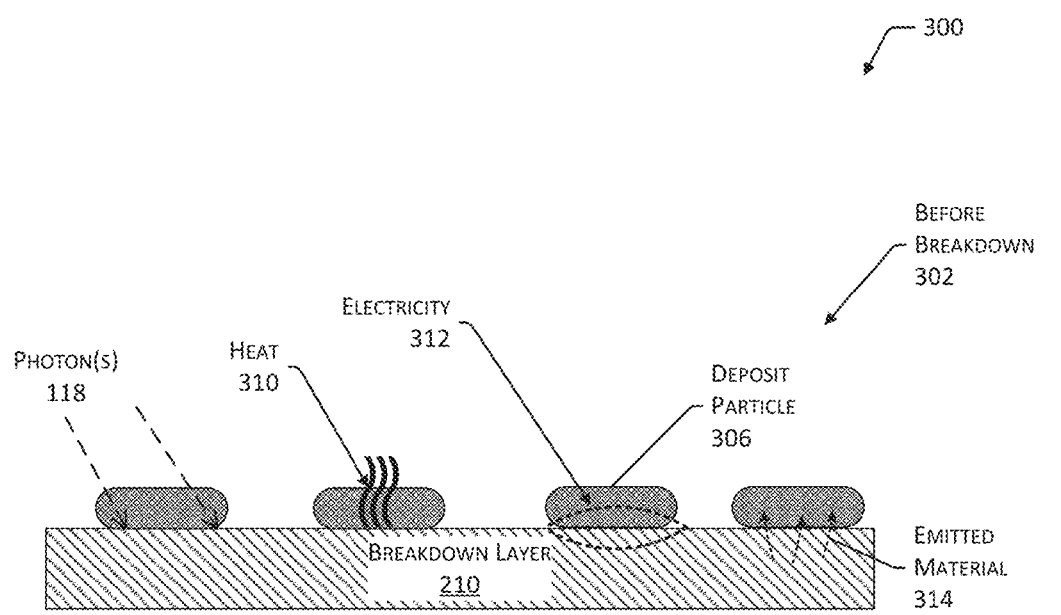
FIG. 3 illustrates the breakdown layer interacting with the deposited material.
Figure 3:
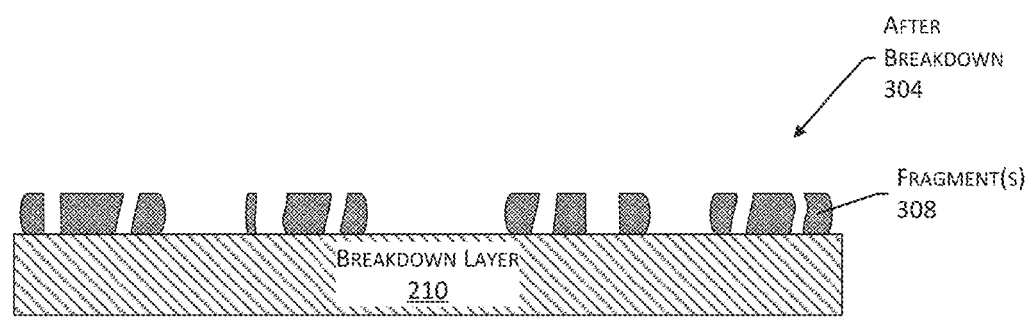

FIG. 3 illustrates examples 300 of the breakdown layer 210 interacting with the deposited material 114. Cross sectional views of the deposited material 114 before breakdown 302 and after breakdown 304 are depicted.

Before breakdown 302, deposit particles 306 are shown in contact with the surface of the breakdown layer 210. In some implementations the deposit particles 306 may be proximate to, but not necessarily in contact with, the breakdown layer 210. In some implementations the deposit 114 may be broken into deposit particles 306 using one or more of the dispersion layers 216, configuration of the breakdown layer 210, and so forth. For example, in one implementation the breakdown layer 210 may comprise surface features configured to direct the deposit 114 into deposit particles 306.

As described above, the breakdown layer 210 is configured to modify the deposit 114. The modification may include physical disassociation or breaking up the deposit particles 306 into fragments 308. These fragments 308 may then be dissipated into the ambient environment through outgassing, mechanical displacement, motion of the surface 110, and so forth. For example, the fragments 308 may volatilize and outgas to the ambient atmosphere. In some implementations, at least a portion of the fragments 308 may be retained within the surface 110. For example, some fragments 308 may remain within the dispersion layer(s) 216.

The fragments 308 may comprise the same compound(s) as the deposit particles 306, such as where the breakdown layer 210 operates to mechanically fragment the deposit particle 306. The fragments 308 may comprise compounds which chemically differ from the deposit particles 306, such as where the modification includes a chemical reaction. For example, the breakdown layer 210 may produce free radicals such as hydroxyl radicals (OH) which chemically react with one or more compounds in the deposit particles 306. This chemical reaction may result in a mechanical fragmentation of the deposit particles 306.

The breakdown layer 210 may comprise one or more materials. These materials may include a catalyst or catalytic material configured to facilitate chemical reactions suitable for breakdown of the deposit particles 306. This catalyst may be activated by one or more mechanisms. As described above, the breakdown layer 210 may be configured to use incident photons 118 in a photocatalytic 120 reaction. For example, incident ultraviolet photons 118 may energize a reaction using titanium dioxide in the breakdown layer 210 to produce free radicals which may then chemically react with the deposit particles 306.

Heat 310 may also be used to supply energy for breakdown of the deposit particles 306. For example, thermocatalysis may take place on the breakdown layer 210 using heat 310 generated by operation of the portable electronic device 102.

In some implementations the breakdown layer 210 may utilize electricity 312 to break down the deposit particles 306. For example, an electrolytic reaction may break apart the deposit particles 306.

The breakdown layer 210 may be operable to emit material 314. For example, the breakdown layer 210 may be operable to emit ions which may then react with the deposit particles 306. For example, the breakdown layer 210 may be doped with, or otherwise include, compounds operable to release ions. Continuing the example, the emitted material 314 may comprise silver ions which are reactive with at least a portion of the deposit 114. In some implementations release of the emitted materials 314 may be controlled using heat 310 or electricity 312.

The breakdown layer 210 may be configured to use one or more of the mechanisms described above. For example, photocatalysis 120 may be used in conjunction with electricity 312 and emitted material 314 to facilitate break down of the deposit particles 306.

In some implementations the breakdown layer 210 may have other characteristics. For example, the breakdown layer 210 may comprise one or more antimicrobial materials, such that microorganisms such as bacteria, viruses, and so forth are destroyed or damaged during the break down process.

Figure 4:
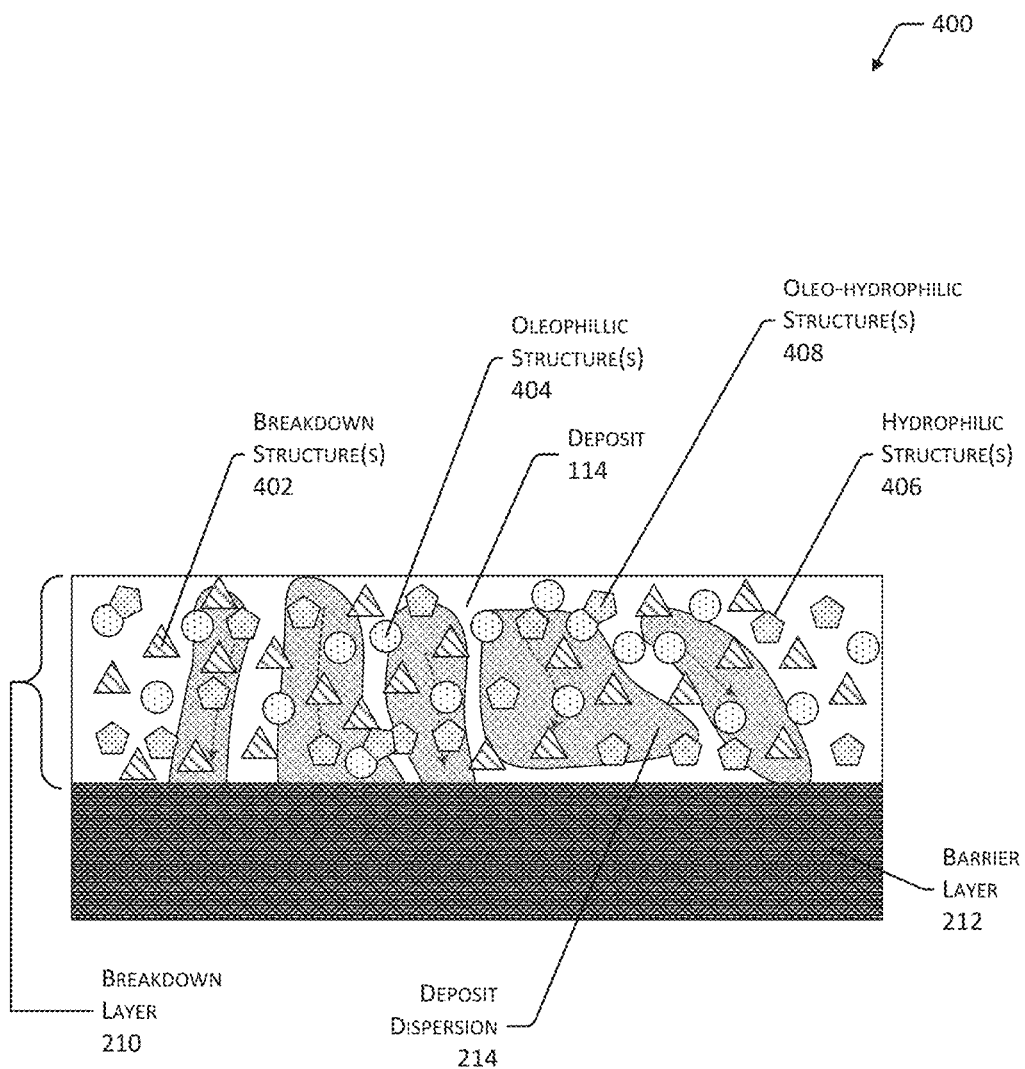
FIG. 4 illustrates a cross section of an alternative of the surface having interspersed structures.

FIG. 4 illustrates a cross section 400 of a variant of the surface 110 depicted in FIG. 2. The cross section is along the line "A-A" as depicted in FIG. 1. Depicted here is an enlarged view of a portion of the surface 110.

In this implementation the breakdown layer 210 comprises a plurality of breakdown structures 402 and one or more of a plurality of oleophilic structures 404 or hydrophilic structures 406. As illustrated here, the one or more breakdown structures 402, the one or more oleophilic structures 404, and the one or more hydrophilic structures 406 are interspersed with one another. This interspersion may be regular or may be amorphous. For example, regular interspersion may comprise an ordered repeating pattern such as breakdown structure 402, oleophilic structure 404, hydrophilic structure 406, which then repeats. Regular interspersion may be provided by selective emplacement, self-assembly, and so forth. In comparison, amorphous distribution or interspersion is depicted here, in which the placement of the various structures is unordered.

The breakdown structures 402 may include catalytic materials. In one implementation the breakdown structures 402 may comprise nanoparticles of titanium dioxide operable to support catalysis. Other materials such as metals operable to emit ions may also be included.

The oleophilic structures 404 comprise one or more oleophilic materials as described above. The hydrophilic structures 406 comprise one or more hydrophilic materials as described above. In some implementations the oleophilic structures 404 and the hydrophilic structures 406 may be combined to form a single structure. In some implementations combined oleo-hydro-philic 408 structures may also be used. These structures may comprise amphiphilic materials. Amphiphilic materials possess both hydrophilic and oleophilic properties. These oleo-hydro-philic structures 408 may provide be configured to provide some hydrophilic action as well as some oleophilic action. The oleo-hydro-philic structures 408 may comprise surfactants, amphiphiles, and so forth. In one implementation, the oleo-hydro-philic structures 408 may comprise polyoxyethylene coupled to one or more other molecules.

The relative positioning of the structures in the breakdown layer 210 as depicted here may be maintained by way of a matrix. The matrix is configured to be porous to the deposit 114. The matrix may comprise a polymer, an aerogel, a sol-gel, a xerogel, a template material, composite material, and so forth. For example, the matrix may comprise a thermoplastic, thermoset polymer, acrylate, polycarbonate, and so forth. In some implementations the polymer matrix may have a low to medium density of cross-links between polymer chains.

For example, the matrix may comprise a silica-based aerogel into which the structures have been placed during or after manufacture. In another example, the structures may be added to liquid silicone rubber, which may subsequently harden with the structures encapsulated within. In another example, during the production of the matrix comprising a template material, one or more of the breakdown structures 402, the oleophilic structures 404, or the hydrophilic structures 406 may be infused into the matrix.

In operation, the breakdown layer 210 depicted here draws the deposit 114 into the interstices of the matrix. The deposit dispersion 214 may be aided by the oleophilic structures 404 and the hydrophilic structures 406. The breakdown structures 402 proximate to the deposit 114, either within the matrix or on the surface thereof, proceed to break down the deposit 114 as described above.

Figure 5:
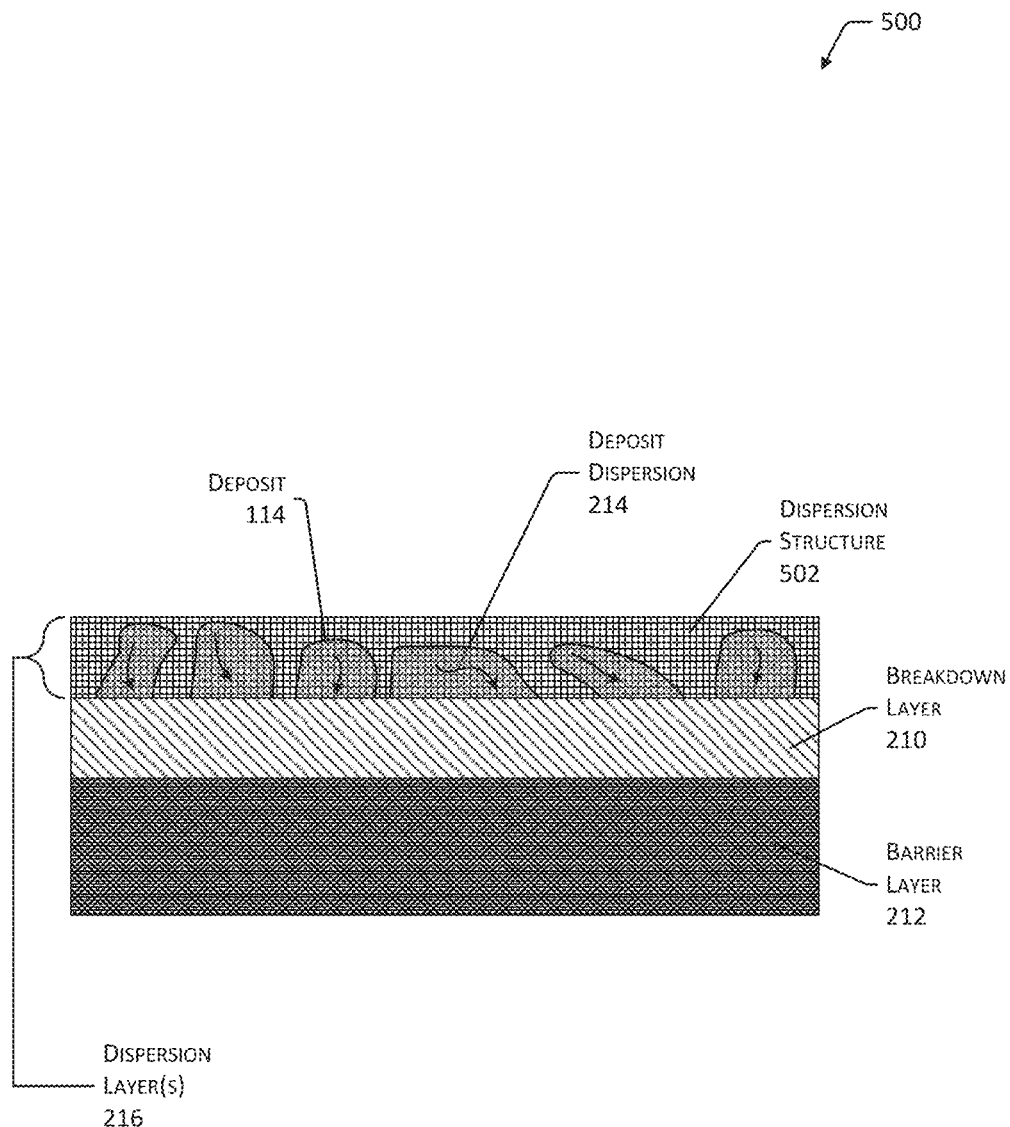
FIG. 5 illustrates a cross section of a surface comprising a dispersion structure and a breakdown layer.

FIG. 5 illustrates a variation 500 of the surface 110 comprising a dispersion structure. The cross section is along the line "A-A" as depicted in FIG. 1. Depicted here is an enlarged view of a portion of the surface 110.

In this implementation, the dispersion layer 216 comprises a dispersion structure 502. The dispersion structure 502 is configured to accept initial contact with the deposit 114. Proximate to the dispersion structure 502 is the breakdown layer 210. The breakdown layer 210, in turn, is proximate to the barrier layer 212.

The dispersion structure 502 may comprise a two- or three-dimensional structure which is configured to provide the deposit dispersion 214. In one implementation the dispersion structure 502 may include a mesh, grid, interlocking space filling array, and so forth. The dispersion structure 502 comprises one or more materials. These materials may be oleophilic, hydrophilic, amphiphilic, oleophobic, hydrophobic, or a combination thereof. For example, the dispersion structure 502 may comprise a mesh having oleophilic material arranged in columns and hydrophilic material arranged in rows. In some implementations an ordinarily phobic material may exhibit philic properties at least in part because of the structure. For example, an oleophobic material formed into a mesh may operate in an oleophilic fashion.

The dispersion structure 502 may comprise features between nanometer and micrometer sizes. For example, the dispersion structure 502 may comprise a nanomesh. The nanomesh may comprise a nanostructured two-dimensional material. The nanomesh may be formed by way of self-assembly techniques. The structure of the nanomesh may include nanometer-scale pores. For example, each pore in the nanomesh may be approximately 2 nanometers in diameter. The nanomesh may support nanocatalysis. In some implementations, the dispersion structure 502 may include a plurality of structures. These structures may include one or more meshes, features, grids, honeycombs, pillars, fractal features, and so forth. In one implementation the structures may comprise nanomeshes. For example, a first nanomesh may be configured to act oleophilically while a second nanomesh may be configured to act hydrophilically.

The dispersion structure 502 may be fabricated using lithography, embossing, chemical action, molecular self-assembly, and so forth. For example, the dispersion structure 502 may be formed by photolithographic techniques.

Figure 6:
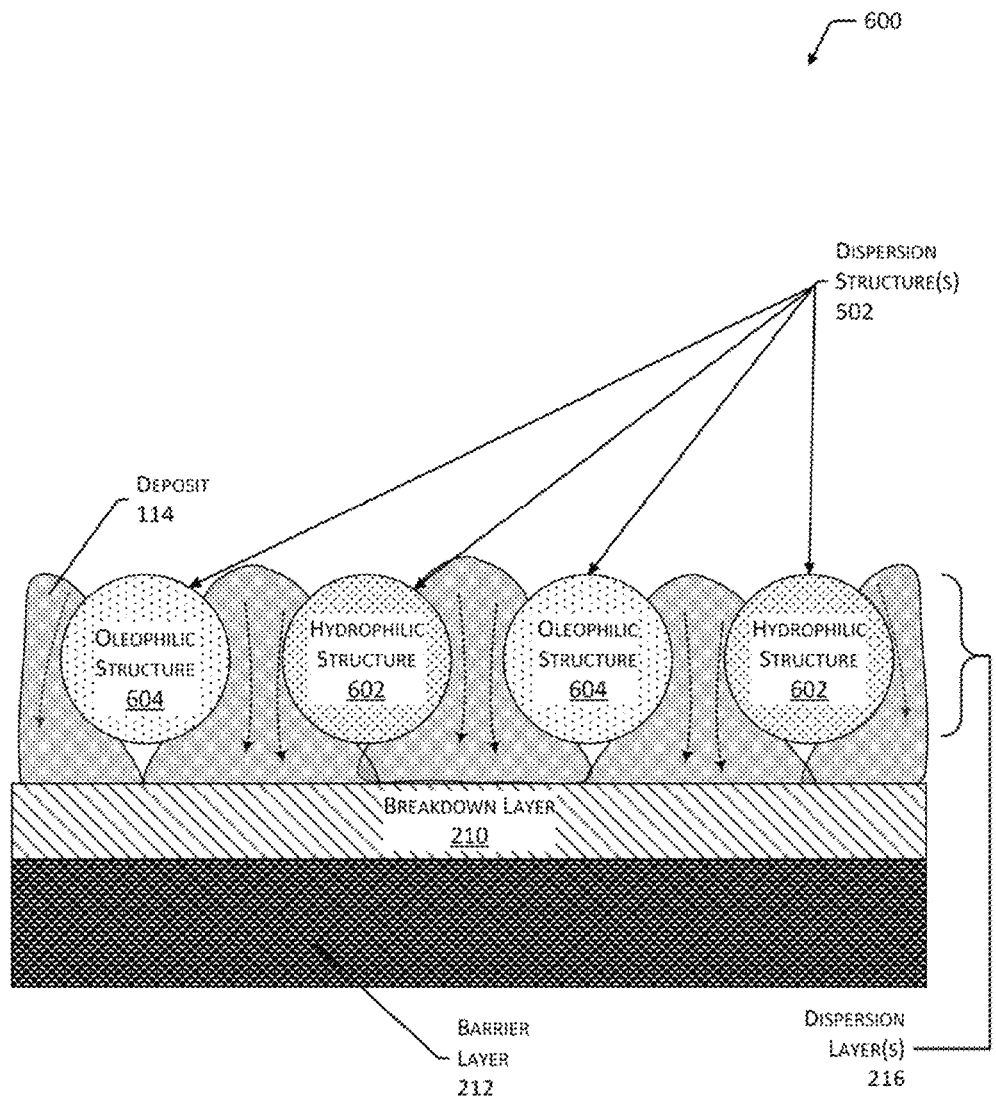
FIG. 6 illustrates a cross section of one implementation of the dispersion structure.

FIG. 6 illustrates a cross section 600 of one implementation of the dispersion structure 502. The cross section is along the line "A-A" as depicted in FIG. 1. Depicted here is an enlarged view of a portion of the surface 110.

In this illustration, the dispersion structure 502 comprises hydrophilic structures 602 and oleophilic structures 604 interspersed with one another. As shown in this example, the oleophilic structures 604 and the hydrophilic structures 602 are generally parallel to one another and arranged within a common plane.

In some implementations the dispersion structure 502 may be configured such that there is a space or gap between portions of the dispersion structure 502 and the breakdown layer 210. This may provide additional surface area on the breakdown layer 210 for the deposit 114 to be dispersed to.

In another example, these oleophilic structures 604 and hydrophilic structures 602 may comprise strands in a mesh. The oleophilic structures 604 comprise an oleophilic material. The hydrophilic structures 602 comprise a hydrophilic material. For example, the structures 602-604 may comprise a core coated with the corresponding hydrophilic or oleophilic material.

In some implementations a single structure may have a first portion which is hydrophilic and a second portion which is oleophilic. For example, one portion of the dispersion structure 502 may be hydrophilic while another portion is oleophilic.

In some implementations the dispersion structure 502 may comprise the oleo-hydro-philic material which is both hydrophilic and oleophilic. For example, the dispersion structure 502 may comprise a material having a water contact angle of about 100 degrees or less and an oil contact angle for squalene of 100 degrees or less. The dispersion structure 502 may be configured with channels or other features configured to elicit the deposit dispersion 214 across the breakdown layer 210.

Figure 7:
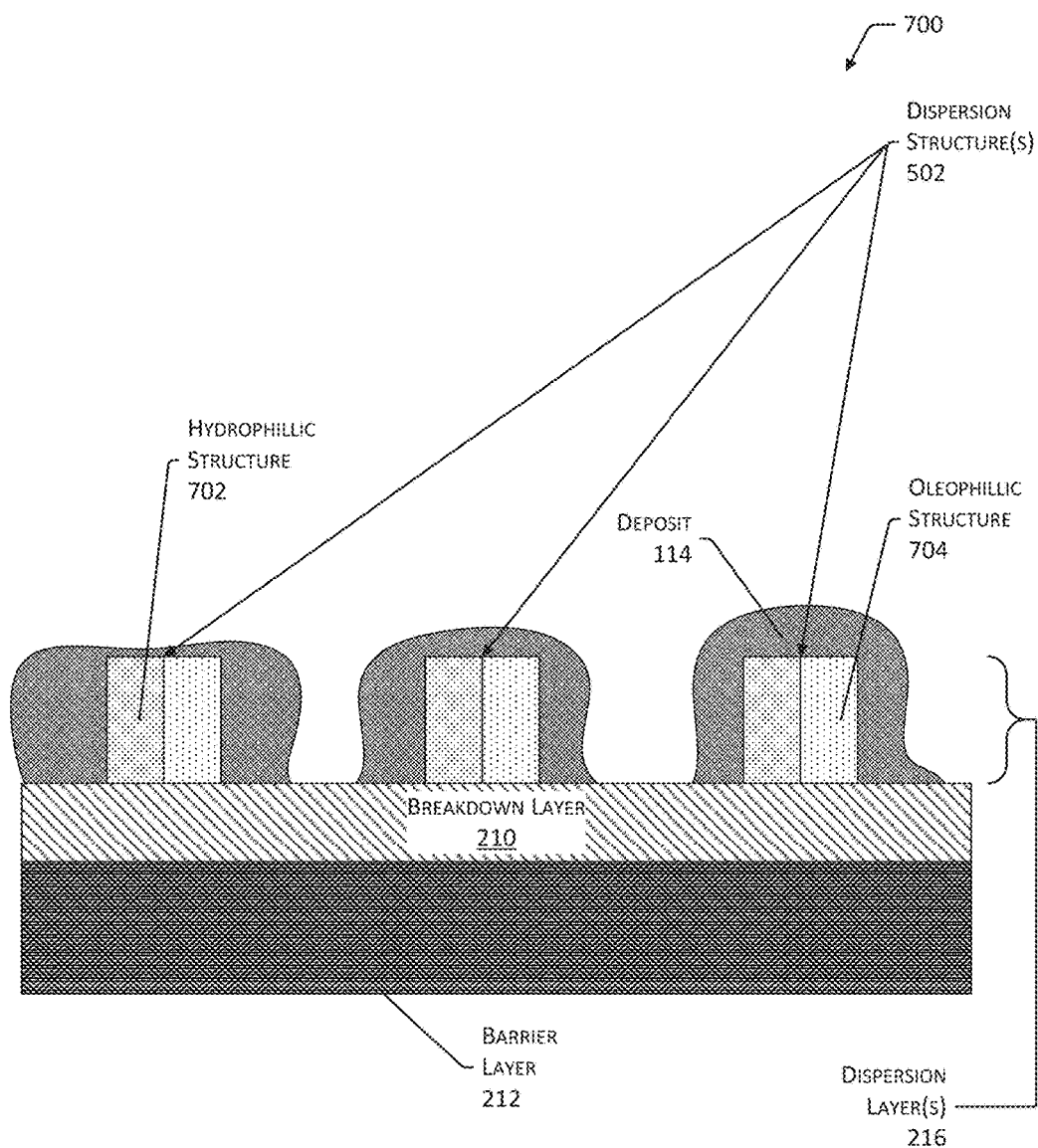
FIG. 7 illustrates a cross section of another implementation of the dispersion structure.

FIG. 7 illustrates a cross section 700 of another implementation of the dispersion structure 502. The cross section is along the line "A-A" as depicted in FIG. 1. Depicted here is an enlarged view of a portion of the surface 110.

In this illustration, the dispersion structures 502 comprise features proximate to or joined with the breakdown layer 210. A crenellated pattern is illustrated, with the crenellations comprising a hydrophilic structure 702 comprising a hydrophilic material and an oleophilic structure 704 comprising an oleophilic material. As described above, the dispersion structures 502 are configured to distribute the deposit 114 across the breakdown layer 210.

In another implementation, the crenellations may comprise a discrete hydrophilic structure 702 separated from the oleophilic structure 704 by a distance. For example, these features may be arranged in a "checkerboard" pattern, alternating in two dimensions across the surface of the breakdown layer 210.

In some implementations the dispersion structure 502 may comprise electrodes. These electrodes may be configured to apply electricity 312 to aid in electrocatalysis or other mechanisms to break down the deposit 114.

Figure 8:
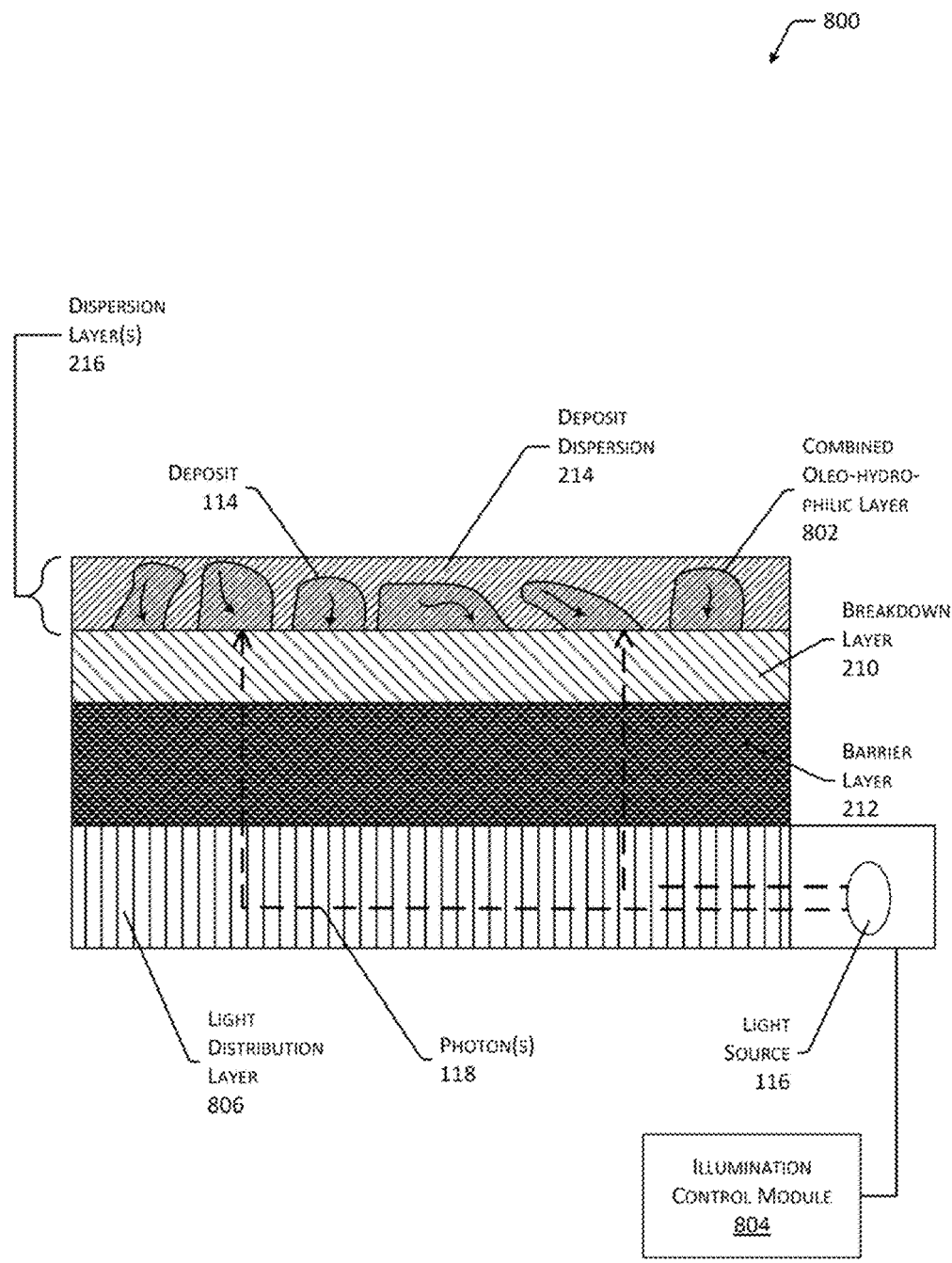
FIG. 8 illustrates a cross section of a surface having a combined oleo-hydrophilic layer proximate to the breakdown layer, and a light source to provide photons to stimulate photocatalysis by the breakdown layer.

FIG. 8 illustrates a cross section along the line "A-A" as depicted in FIG. 1 of another implementation 800 of the surface 110. In this implementation, the dispersion layer 216 comprises a combined oleo-hydro-philic layer 802 ("combined layer"). The combined layer 802 may comprise both oleophilic material and hydrophilic material. For example, oleophilic particles and hydrophilic particles may be placed into a matrix which is permeable to the deposit 114. The combined layer 802 is configured to provide deposit dispersion 214 of the deposit 114 so as to increase the surface area of the deposit 114 proximate to the breakdown layer 210.

In implementations where the breakdown layer 210 uses photocatalysis 120, the photons 118 used to activate the reaction may be provided at least in part from a light source 116 which is part of the device 102. For example, the light source 116 may comprise one or more illuminators such as light emitting diodes or quantum dots coupled to an illumination control module 804. The illumination control module 804 may be configured to receive a signal, and based on that signal, activate the one or more illuminators. The illuminators may be configured to emit ultraviolet light suitable to produce the photocatalysis 120 with titanium dioxide in the breakdown layer 210. In other implementations, the illuminators may provide photons 118 of other wavelengths as used to activate the breakdown layer 210.

A light distribution layer 806 may be coupled to the barrier layer 212 (or the breakdown layer 210 where the barrier layer 212 is omitted) and to the light source 116. The light distribution layer 806 is configured to distribute photons 118 from the light source 116 across the breakdown layer 210. The light distribution layer 806 may provide a uniform distribution, or the distribution may provide higher photon levels 118 at particular points or regions on the breakdown layer 210. The light distribution layer 806 may use refraction, reflection, diffraction, and so forth to distribute the light. In some implementations the light distribution layer 806 may be omitted and the light source 116 may illuminate the breakdown layer 210 directly. In some implementations the light source 116 may also act as a backlight or a front light to a display 106.

Figure 9:
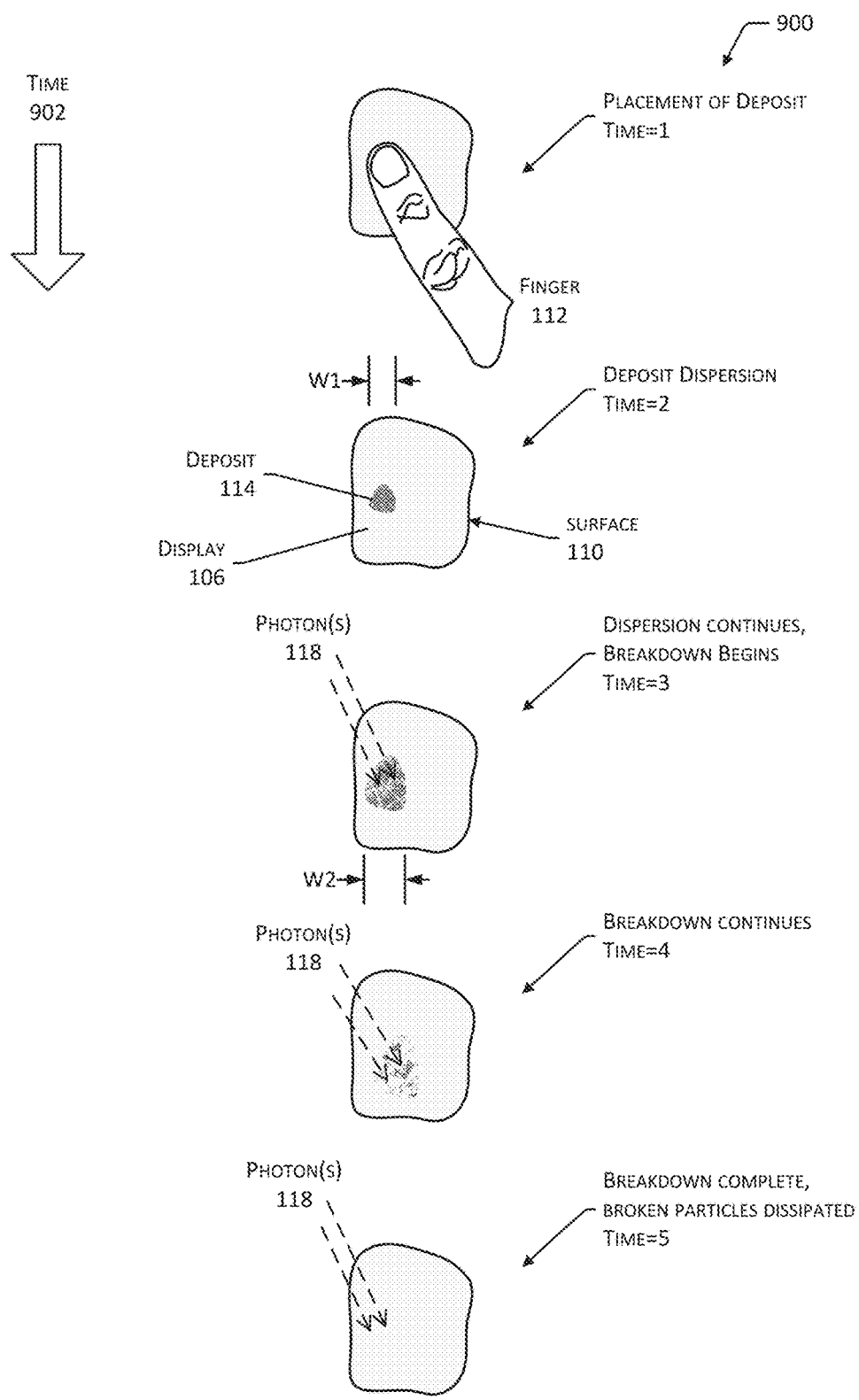
FIG. 9 illustrates the placement of a deposit on the surface, and the breakdown over time until dissipated.

FIG. 9 illustrates a sequence 900 of the deposit 114 on the surface 110 over time. In this illustration, time increases down the page as indicated by the arrow 902.

At time=1, the deposit 114 is placed on the surface of the surface 110. For example, the finger 112 may have touched the surface of the surface 110 which is atop the enclosure 104. This touch leaves behind a deposit 114, such as a fingerprint. The deposit 114 interferes with the appearance of the surface 110. For example, the fingerprint may be visible.

At time=2, the deposit 114 is dispersed by the dispersion layer(s) 216. As described above, the deposit 114 having a width "W1" at the time of deposition may be drawn into the dispersion layer(s) 216, at least until those layers are saturated. At this point, the deposit 114 may be much less apparent to the user. For example, the fingerprint may appear to fade.

At time=3, dispersion continues, the deposit particles 306 of the deposit 114 are proximate to the breakdown layer 210 or breakdown structures 402, and breakdown begins. As indicated, the deposit 114 may have spread out, as indicated by width "W2". For example, the photons 118 may activate the photocatalysis 120 such that free radicals produced thereby begin to disassociate the deposit particles 306 into fragments 308.

At time=4, the breakdown continues. The dispersion layer(s) 216 may also continue to disperse the deposit 114, increasing the surface area thereof and thus increasing the quantity of the deposit 114 which are reacted with by the breakdown layer 210 or the breakdown structures 402. The deposit 114 continues to break down into deposit particles 306 which may be outgassed, or which fall away from the surface 110, leaving the surface 110 clean.

At time=5, the breakdown is complete and the fragments 308 have been dissipated. While some deposit particles 306 or fragments 308 may remain, the majority have been removed from the surface 110. As a result, the deposit 114 is much less visible to the user, or may be gone completely. The surface 110 may now appear to be clean, and the user experience is improved.

Figure 10:
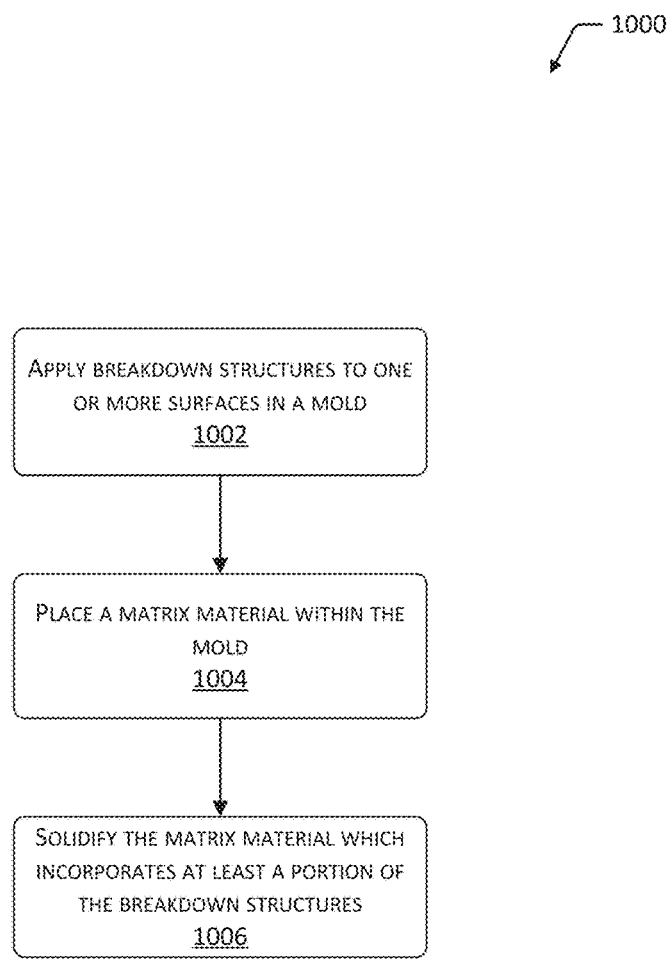
FIG. 10 is a flow diagram of a process of assembling the surface by way of molding.

FIG. 10 is a flow diagram 1000 of a process of assembling the surface 110 by way of molding. The process may be performed manually, automatically, or by a combination of manual and automatic steps.

In some implementations, the surface 110, or an object which will incorporate the surface 110 such as the enclosure 104, may be created by molding. For example, injection molding may be used to create the surface 110 which may then be applied to the enclosure 104. In another example, the enclosure 104 may be formed using injection molding at which time the surface 110 as described above may be formed.

At 1002, breakdown structures 402 are introduced into at least a portion of a mold. In one implementation the breakdown structures 402 may be blown into the mold as a powder. In another implementation, the breakdown structures 402 may be dispersed within the mold as a liquid. In one implementation the breakdown structures 402 may comprise titanium dioxide nanoparticles. In some implementations one or more other structures such as the oleophilic structures 404, the hydrophilic structures 406, and so forth may also be introduced into the mold. Furthermore, in some implementations the various structures may be introduced in a particular order so as to generate particular layers or structures within the resulting surface 110. For example, the oleophilic structures 404 and the hydrophilic structures 406 may be introduced into the mold first, followed by the breakdown structures 402.

At 1004, matrix material is placed within the mold. The matrix material may comprise a liquid, powder, granulated material, solid, and so forth. For example, the matrix material may comprise liquid silicone rubber which is pumped or poured into the mold.

In some implementations additional mechanisms may be used to distribute one or more of the structures throughout the matrix material. These may include centrifuging the mold, applying an electrical field, applying a magnetic field, applying a temperature gradient, and so forth.

At 1006 the matrix material is solidified, incorporating at least a portion of the breakdown structures 402, the oleophilic structures 404, and the hydrophilic structures 406 and Introduced into the mold. Thus, the matrix material acts to retain at least a portion of the structures introduced into the mold. Solidification of the matrix material may include curing or other processes such as application of pressure, light, heat, electricity, waiting, and so forth. In some implementations the structures may act as a release agent to separate the matrix material of the now formed surface 110 from a surface of the mold.

In some implementations additional operations may be performed. For example, the now solidified material which forms the matrix may be processed to introduce interstices or pores through which the deposit 114 may travel to come into contact with the breakdown structures 402 retained therein.

Figure 11:
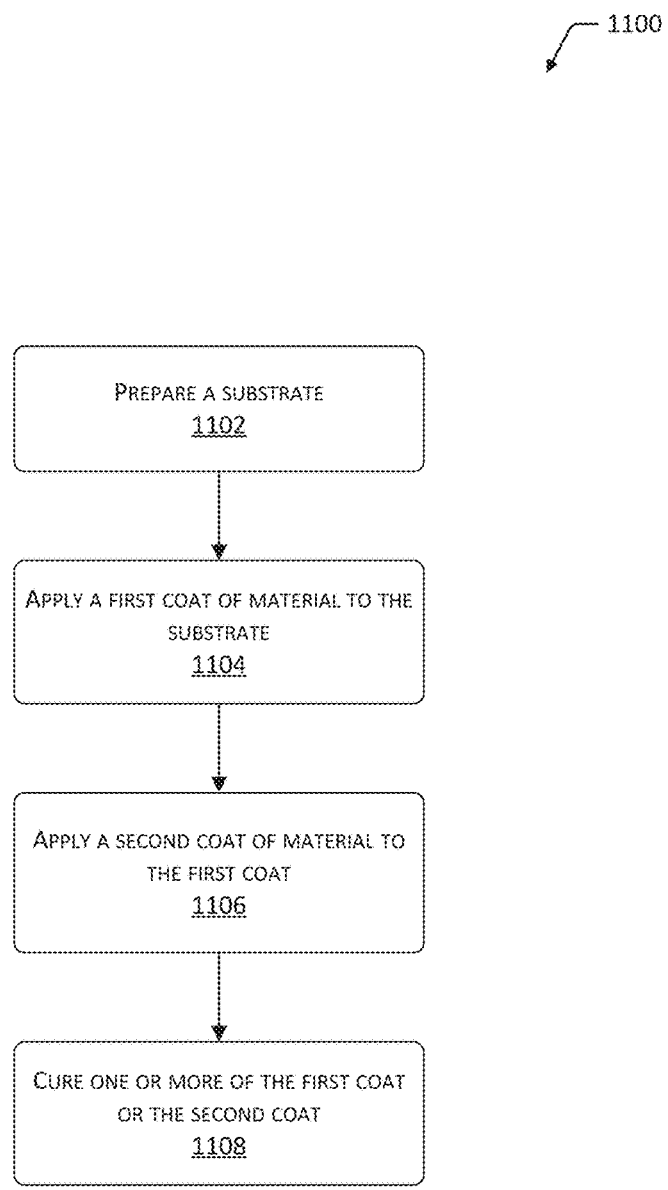
FIG. 11 is a flow diagram of a process of creating the surface by way of coating.

FIG. 11 is a flow diagram 1100 of a process of creating the surface 110 by way of coating. Coating may include the process of applying one or more materials to a surface by way of a spray, mist, brush, electroplating, electrostatic charge, electrophoretic coating, liquid coating, and so forth. In one example, the coating may employ a material in a solvent or carrier material, such as in electrophoretic deposition in which colloidal particles are suspended in the solvent and migrate under the influence of an electric field. In another example, no solvent or carrier may be employed, such as in powder coating.

At 1102, a substrate is prepared for application of material. The preparation may include one or more of application of a primer, cleaning, sanding, and so forth. The substrate may comprise a portion of the enclosure 104, the barrier layer 212, the breakdown layer 210, or other structure.

At 1104 a first coat of material is applied to at least a portion of the substrate. The first coat of material may comprise breakdown structures 402. In some implementations the first coat may be cured before proceeding to 1106.

At 1106 a second coat of material is applied to at least a portion of the first coat of material. The second coat of material may comprise one or more of the oleophilic structures 404, the hydrophilic structures 406, or structures which are both oleophilic and hydrophilic.

At 1108, one or more of the first coat or the second coat cure. The curing may include the use of heat, light, moisture, waiting, application of another material, and so forth. For example, the surface 110 may be illuminated with ultraviolet light for a predetermined period of time to cure the materials.

In some implementations, an additional coat or layer of material porous to the deposit 114 may be applied. The additional coat may modify abrasion resistance of the surface 110, change the color of the surface 110, and so forth. Additionally, in some implementations a single coat or more than two coats of material may be applied to the substrate.

Figure 12:
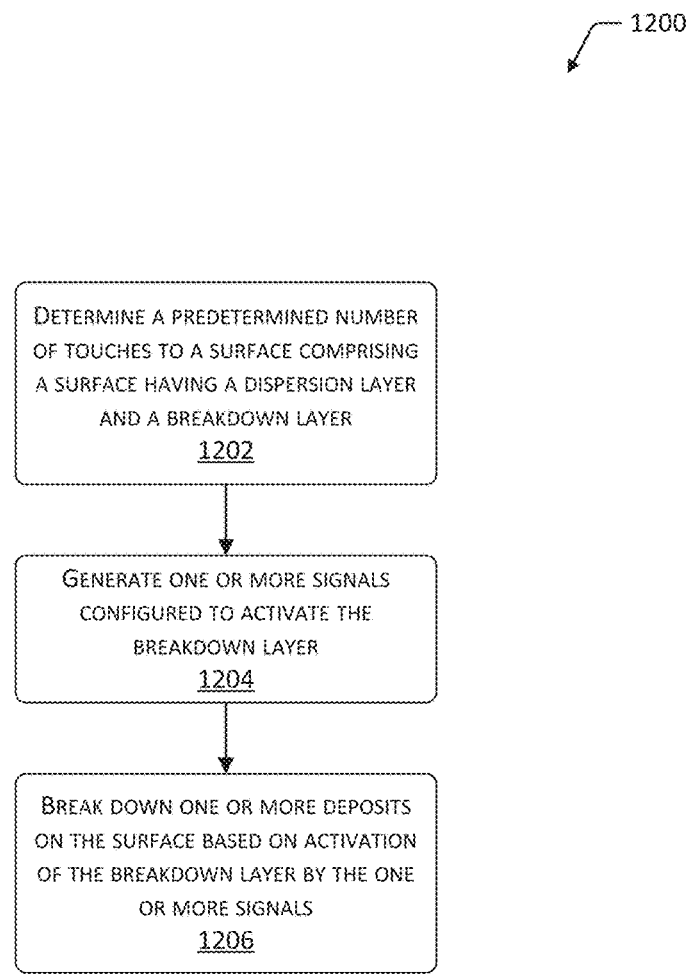
FIG. 12 is a flow diagram of a process of activating the breakdown layer using one or more signals.

FIG. 12 is a flow diagram 1200 of a process of activating the breakdown layer 210 using one or more signals. The portable electronic device 102 may perform the process.

Block 1202 determines a predetermined number of touches to a surface comprising the surface 110. For example, an input control may determine that 95 touches have been made to the surface 110 based on touch sensor input. As described above, the surface 110 includes a dispersion layer 216 and a breakdown layer 210.

Block 1204 generates one or more signals configured to activate the breakdown layer 210. This generation may be based on the predetermined number of touches having been reached or exceeded. For example, a processor may be configured to generate an interrupt signal which in turn activates circuitry controlling the light source 116 in the device 102, such as described in FIG. 8. In another example, the interrupt signal may activate circuitry controlling the application of heat 310, electricity 312, emission of material 314, and so forth as described above with regard to FIG. 3.

Block 1206 breaks down one or more deposits 114 on the surface 110 based on activation of the breakdown layer 210 by the one or more signals. For example, the deposit 114 may be broken down by photocatalysis 120 which is activated by the photons 118 produced by the light source 116 which has been turned on by the interrupt signal.

In another implementation, a timer may be used such that the generation of the one or more signals occurs after a predetermined amount of time that the device is in operation. In yet another implementation, a sensor may detect the deposit(s) 114 on the surface 110 and based on that detection generate the one or more signals.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the devices and techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A portable electronic device comprising:
   a processor configured to execute one or more instructions;
   a display device coupled to the processor, the display device configured to emit light; and
   an enclosure configured to contain the processor and at least a portion of the display device, the enclosure comprising:
      a barrier layer associated with the display device and comprising at least one of metal, plastic, or composite material such as to be impermeable to water and oil;
      a breakdown layer proximate to the barrier layer, the breakdown layer operable to modify at least a portion of a deposited material placed in contact therewith responsive to the light emitted from the display device;
      a hydrophilic layer proximate to the breakdown layer, the hydrophilic layer comprising a hydrophilic material that disperses aqueous components of the deposited material; and
      an oleophilic layer proximate to the hydrophilic layer, the oleophilic layer comprising an oleophilic material that disperses oil-based components of the deposited material across at least a portion of the breakdown layer.

2. The device of claim 1, wherein the deposited material comprises a fingerprint and further wherein:
   the breakdown layer is positioned on top of the barrier layer,
   the hydrophilic layer is positioned on top of the breakdown layer, and
   the oleophilic layer is positioned on top of the hydrophilic layer.

3. A device comprising:
   one or more breakdown structures configured to modify at least a portion of a deposited material located proximate thereto;
   one or more hydrophilic structures configured to disperse aqueous components of the deposited material, the one or more hydrophilic structures including elongate shapes spaced apart from one another to form one or more of first rows or first columns; and
   one or more oleophilic structures configured to disperse oil-based components of the deposited material, the one or more oleophilic structures including elongate shapes spaced apart from one another to form one or more of second rows or second columns, the one or more hydrophilic structures and the one or more oleophilic structures forming a dispersion layer having a mesh shape.

4. The device of claim 3, wherein the one or more hydrophilic structures and the one or more oleophilic structures are interspersed in a pattern in which the one or more hydrophilic structures are arranged in rows and the one or more oleophilic structures are arranged in columns positioned at an angle relative to the rows.

5. The device of claim 3, wherein the one or more hydrophilic structures and the one or more oleophilic structures are interspersed in an ordered, alternating repeating pattern in which the one or more hydrophilic structures and the one or more oleophilic structures are generally parallel to one another and arranged in a common plane.

6. The device of claim 3, wherein the one or more breakdown structures are positioned in a breakdown layer and the one or more hydrophilic structures and the one or more oleophilic structures are spaced apart from the one or more breakdown structures to define a gap between the dispersion layer and the breakdown layer, the gap increasing a surface area of the breakdown layer contacted by the deposited material.

7. The device of claim 3, wherein at least a portion of the one or more breakdown structures comprises surface features configured to physically disassociate the deposited material into fragments.

8. A device comprising:
a breakdown layer operable to modify at least a portion of a deposited material; and
a dispersion layer external to the breakdown layer, wherein the dispersion layer is operable to physically disperse the at least a portion of the deposited material toward the breakdown layer, such that a surface area of the deposited material is increased from a first surface area at a first time upon deposition to the dispersion layer to a second surface area at a second time, wherein the second surface area is greater than the first surface area.

9. The device of claim 8, wherein the dispersion layer further comprises:
one or more hydrophilic structures comprising one or more hydrophilic materials operable to disperse aqueous components of the deposited material, the one or more hydrophilic structures including elongate shapes spaced apart from one another to form one or more of first rows or first columns;
one or more oleophilic structures comprising one or more oleophilic materials operable to disperse oil-based components of the deposited material, the one or more oleophilic structures including elongate shapes spaced apart from one another to form one or more of second rows or second columns, the one or more hydrophilic structures and the one or more oleophilic structures forming a dispersion layer having a mesh shape; and
wherein the one or more hydrophilic materials exhibit a contact angle of less than 100 degrees and the one or more oleophilic materials exhibit an oil contact angle for squalene of less than 40 degrees.

10. The device of claim 8, wherein the breakdown layer is operable to act as a catalyst for a chemical reaction, the chemical reaction having as a reactant the deposited material as dispersed by the dispersion layer.

11. The device of claim 8, wherein the dispersion layer further comprises one or more breakdown structures interspersed therein, the breakdown structures operable to chemically react with the deposited material.

12. The device of claim 1, wherein the breakdown layer is positioned on top of the barrier layer, the oleophilic layer is positioned on top of the breakdown layer, and the hydrophilic layer is positioned on top of the oleophilic layer.

13. The device of claim 3, wherein the one or more hydrophilic structures and the one or more oleophilic structures are positioned external to the one or more breakdown structures.

14. The device of claim 8, wherein the breakdown layer is spaced from the dispersion layer to define a gap between the breakdown layer and the dispersion layer for increasing an area of the breakdown layer contacted by the deposited material.

15. The device of claim 8, wherein the dispersion layer comprises one or more dispersion structures proximate to or joined with the breakdown layer to form a crenellated pattern.

16. The device of claim 8, further comprising a barrier layer, wherein the breakdown layer is external to the barrier layer, and wherein the barrier layer is configured to provide one or more of light or heat to the breakdown layer to cause one or more of photocatalysis or thermocatalysis of the deposited material.

17. The device of claim 8, further comprising:
one or more illuminators positioned in association with the breakdown layer, the one or more illuminators configured to emit light, the breakdown layer configured to modify the at least a portion of the deposited material responsive to the light emitted by the one or more illuminators.

18. The device of claim 17, further comprising a light distribution layer associated with the barrier layer, the light distribution layer configured to distribute the light emitted by the one or more illuminators across the breakdown layer.

19. The device of claim 17, further comprising:
a processor configured to execute one or more instructions;
the one or more instructions including an illumination control module configured to:
determine a count of touches to a surface associated with the breakdown layer;
based at least in part on the count of touches, provide a signal to the one or more illuminators, the signal configured to actuate the one or more illuminators to emit the light.

20. The device of claim 17, wherein the one or more illuminators are associated with a display device, the breakdown layer being positioned on at least a portion of the display device.

* * * * *